(12) United States Patent
Zhou et al.

(10) Patent No.: US 11,366,625 B1
(45) Date of Patent: Jun. 21, 2022

(54) METHOD AND A SERIAL COMMUNICATOR FACILITATING MULTIPLE AND SYNCHRONOUS COMMUNICATION WITH THREE-DIMENSIONAL (3D) PRINTERS (71) Applicants: Haoliang Zhou, Maple (CA); Simarpal Kalsi, Brampton (CA); Riteshkumar Parmar, Toronto (CA)

(72) Inventors: Haoliang Zhou, Maple (CA); Simarpal Kalsi, Brampton (CA); Riteshkumar Parmar, Toronto (CA)

( * ) Notice: Subject to any disclaimer, the term of this patent is extended or adjusted under 35 U.S.C. 154(b) by 105 days.

(21) Appl. No.: 17/011,773

(22) Filed: Sep. 3, 2020

(51) Int. Cl.
*G06F 3/12* (2006.01)
*B33Y 30/00* (2015.01)
*G06T 7/00* (2017.01)

(52) U.S. Cl.
CPC .......... *G06F 3/1264* (2013.01); *G06F 3/1207* (2013.01); *G06F 3/1259* (2013.01); *G06T 7/0004* (2013.01); *G06F 3/1288* (2013.01); *G06T 2207/30144* (2013.01)

(58) Field of Classification Search
None
See application file for complete search history.

(56) References Cited

U.S. PATENT DOCUMENTS

| | | | | |
|---|---|---|---|---|
| 10,108,381 | B1* | 10/2018 | Zinchenko | G06F 3/1288 |
| 10,423,367 | B1* | 9/2019 | Yamamoto | G06F 3/126 |
| 2015/0081878 | A1* | 3/2015 | Pabba | H04L 41/0213 709/224 |
| 2016/0209819 | A1* | 7/2016 | Cudak | G05B 15/02 |
| 2017/0031635 | A1* | 2/2017 | Pettis | G06F 3/1226 |
| 2020/0285430 | A1* | 9/2020 | Coulter | G06F 3/1259 |

\* cited by examiner

*Primary Examiner* — Andrew H Lam
(74) *Attorney, Agent, or Firm* — Heena N. Kampani; Law Office of Heena N. Kampani (57) ABSTRACT

A method and a serial communicator facilitating multiple and synchronous communication with three-dimensional (3D) printers are disclosed. The serial communicator establishes serial communication with a plurality of 3D printers. The serial communicator concurrently sends and receives commands, instructions and status message from each of the plurality of 3D printers. The serial communicator provides multiple and synchronous dimensionality for a user to execute 3D printing. A user accesses the serial communicator using a user device or user management system (UMS) for managing multiple series connections to multiple 3D printers. The serial communicator receives 3D modelling data containing a tool path (Gcode) from the UMS. The serial communicator assigns the 3D modelling data to available 3D printer for executing the 3D printing using the serial communication.

20 Claims, 9 Drawing Sheets

METHOD AND A SERIAL COMMUNICATOR FACILITATING MULTIPLE AND SYNCHRONOUS COMMUNICATION WITH THREE-DIMENSIONAL (3D) PRINTERS

FIELD OF THE DISCLOSURE

The present invention generally relates to three-dimensional (3D) printers. More specifically, the present invention relates to a multiple and synchronous 3D printer communication system that can manage multiple serial connections to multiple 3D printers.

BACKGROUND OF THE DISCLOSURE

Three-dimensional (3D) printing or additive manufacturing is a process of constructing a 3D solid object from a Computer-Aided Design (CAD) or digital model. Generally, 3D printing is achieved by industrial robots, also called as 3D printers.

With increase in technology, several features have been added to 3D printers. For instance, 3D printers have been provided with network capabilities to provide a single point access for remote users to manage access and print 3D objects simultaneously. One such example is disclosed in a U.S. Pat. No. 10,114,591 ("'591 patent"). The '591 patent discloses that three-dimensional fabrication resources are improved by adding networking capabilities to three-dimensional printers and providing a variety of tools for networked use of three-dimensional printers. Web-based servers or the like can provide a single point of access for remote users to manage access to distributed content on one hand, and to manage use of distributed fabrication resources on the other.

Another example is disclosed in a United States Publication No. 20160209819 ("'819 Publication"). The '819 Publication discloses executing an additive manufacturing job by a plurality of additive manufacturing printers, including: detecting service requirements for the additive manufacturing job; detecting service capabilities for the plurality of additive manufacturing printers; identifying, for each of a plurality of segments of the additive manufacturing job, one or more additive manufacturing printers capable of servicing the segment of the additive manufacturing job in dependence upon the service requirements for the additive manufacturing job and the service capabilities for the plurality of additive manufacturing printers; and assigning each segment of the additive manufacturing job to one of the additive manufacturing printers identified as being capable of servicing the segment of the additive manufacturing job, wherein two or more of the additive manufacturing printers are each assigned at least one distinct segment of the additive manufacturing job.

Above disclosure have few problems. For instance, the above disclosure uses 1:1 ratio for control device i.e. the server and the 3D printer. As a result, they cannot allow to control multiple 3D printers from a single platform and limits the utilization of 3D printers.

BRIEF SUMMARY OF THE DISCLOSURE

It is an object of the present invention to provide multiple and synchronous 3D printer communication system that avoids the drawback of known methods.

It is another object of the present invention to provide a 3D printer communication system facilitating a single application capable of managing multiple serial connections to multiple 3D printers.

It is another object of the present invention to provide a 3D printer communication system utilizing serial communication to establish connection with supported 3D printers.

In order to overcome the problems in the prior art, the present invention provides a serial communicator facilitating multiple and synchronous communication with three-dimensional (3D) printers. The serial communicator establishes serial communication with a plurality of 3D printers. The serial communicator concurrently sends and receives commands, instructions and status message from each of the plurality of 3D printers. Serial communicator provides multiple and synchronous dimensionality for user to execute 3D printing.

The serial communicator establishes connection with supported 3D printers using serial connection. The serial communicator allows to concurrently connect to n i.e., multiple number of 3D printers with a single application. The number of 3D printers that connect using serial connection depends on the amount of serial buses available on the serial communicator. This allows to concurrently send and receive commands, instructions and status message from the 3D printers to the serial communicator.

User accesses the serial communicator using a user device or a user management system (UMS) for managing multiple series connections to multiple 3D printers. The serial communicator receives 3D modelling data containing a tool path (Gcode) from the UMS or user device. The serial communicator assigns the 3D modelling data to available 3D printer for executing the 3D printing using serial communication.

The serial communicator automatically assigns the print job to available 3D printer based on the eligibility of available 3D printers. This ensures that the serial communicator allows to manage a fleet of 3D printers for a distributed manufacturing system's ecosystem.

Features and advantages of the subject matter hereof will become more apparent in light of the following detailed description of selected embodiments, as illustrated in the accompanying FIGUREs. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

The present subject matter will now be described in detail with reference to the drawings, which are provided as illustrative examples of the subject matter to enable those skilled in the art to practice the subject matter. It will be noted that throughout the appended drawings, like features are identified by like reference numerals. Notably, the FIGUREs and examples are not meant to limit the scope of the present subject matter to a single embodiment, but other embodiments are possible by way of interchange of some or all of the described or illustrated elements and, further, wherein.

DETAILED DESCRIPTION OF THE EMBODIMENTS

The detailed description set forth below in connection with the appended drawings is intended as a description of exemplary embodiments in which the presently disclosed subject matter can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and serial communicator. However, it will be apparent to those skilled in the art that the presently disclosed subject matter may be practiced without these specific details. In some instances, well-known structures and devices are shown in functional or conceptual diagram form in order to avoid obscuring the concepts of the presently disclosed method and serial communicator.

In the present specification, an embodiment showing a singular component should not be considered limiting. Rather, the subject matter preferably encompasses other embodiments including a plurality of the same component, and vice-versa, unless explicitly stated otherwise herein. Moreover, the applicant does not intend for any term in the specification or claims to be ascribed an uncommon or special meaning unless explicitly set forth as such. Further, the present subject matter encompasses present and future known equivalents to the known components referred to herein by way of illustration.

Although the present disclosure provides a description of multiple and synchronous 3D printer communication system, it is to be further understood that numerous changes may arise in the details of the embodiments of the multiple and synchronous 3D printer communication system. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

Figure 1A:
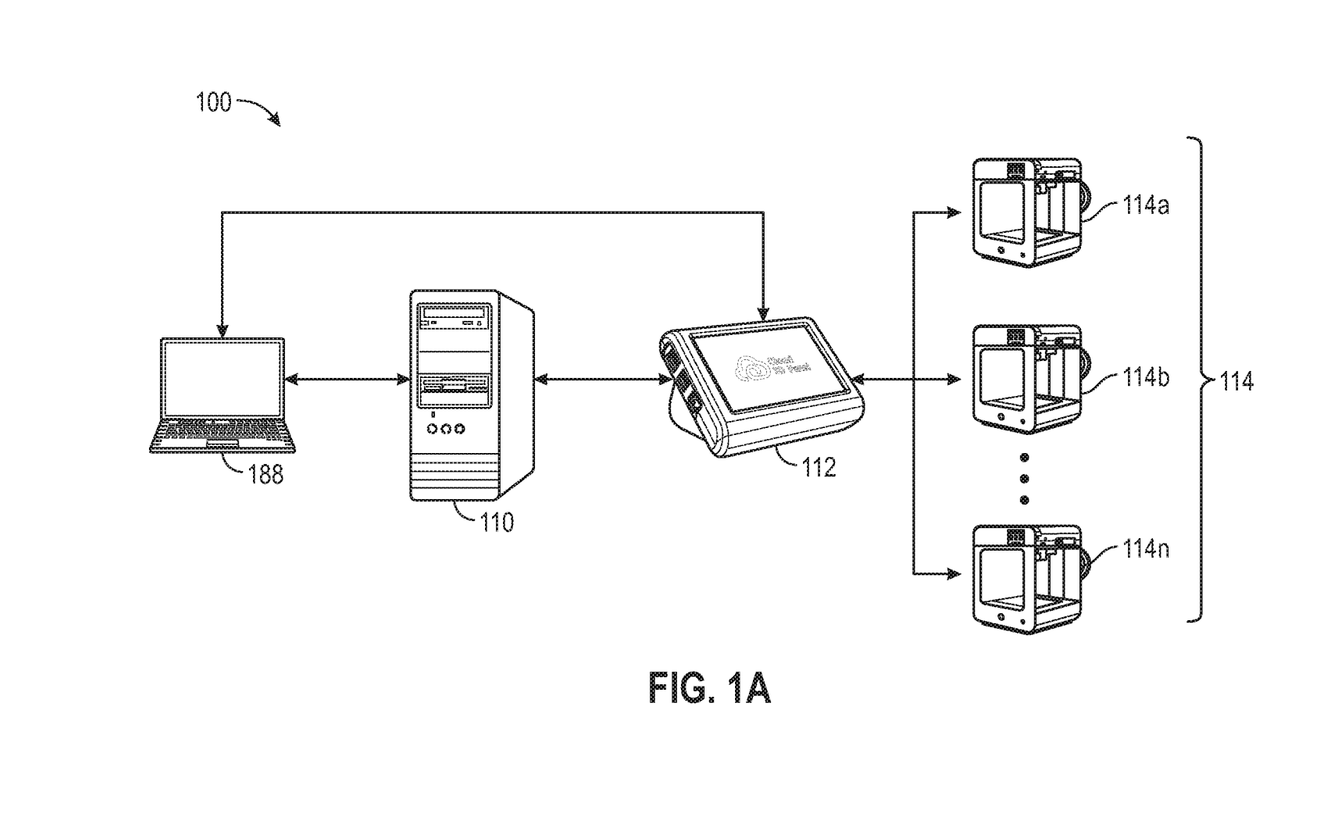
FIGS. 1A and 1B illustrate an environment and a block diagram of a serial communicator facilitating multiple and synchronous communication with three-dimensional (3D) printers, in accordance with one embodiment of present invention.

In one embodiment, the present invention discloses a serial communicator facilitating multiple and synchronous communication with three-dimensional (3D) printers. FIG. 1A shows an environment 100 in which User Management System (UMS) 110 communicates with serial communicator or serial communication module 112 for managing plurality of three-dimensional (3D) printers 114. In one example, serial communicator 112 forms part of user device 188. Plurality of three-dimensional (3D) printers 114 may include first 3D printer 114*a*, second 3D printer 114*b*, . . . $n_{th}$ 3D printer 114*n* and so on. For ease of reference, plurality of 3D printers 114 may be referred as 3D printer(s) 114 in the following description.

Figure 1B:
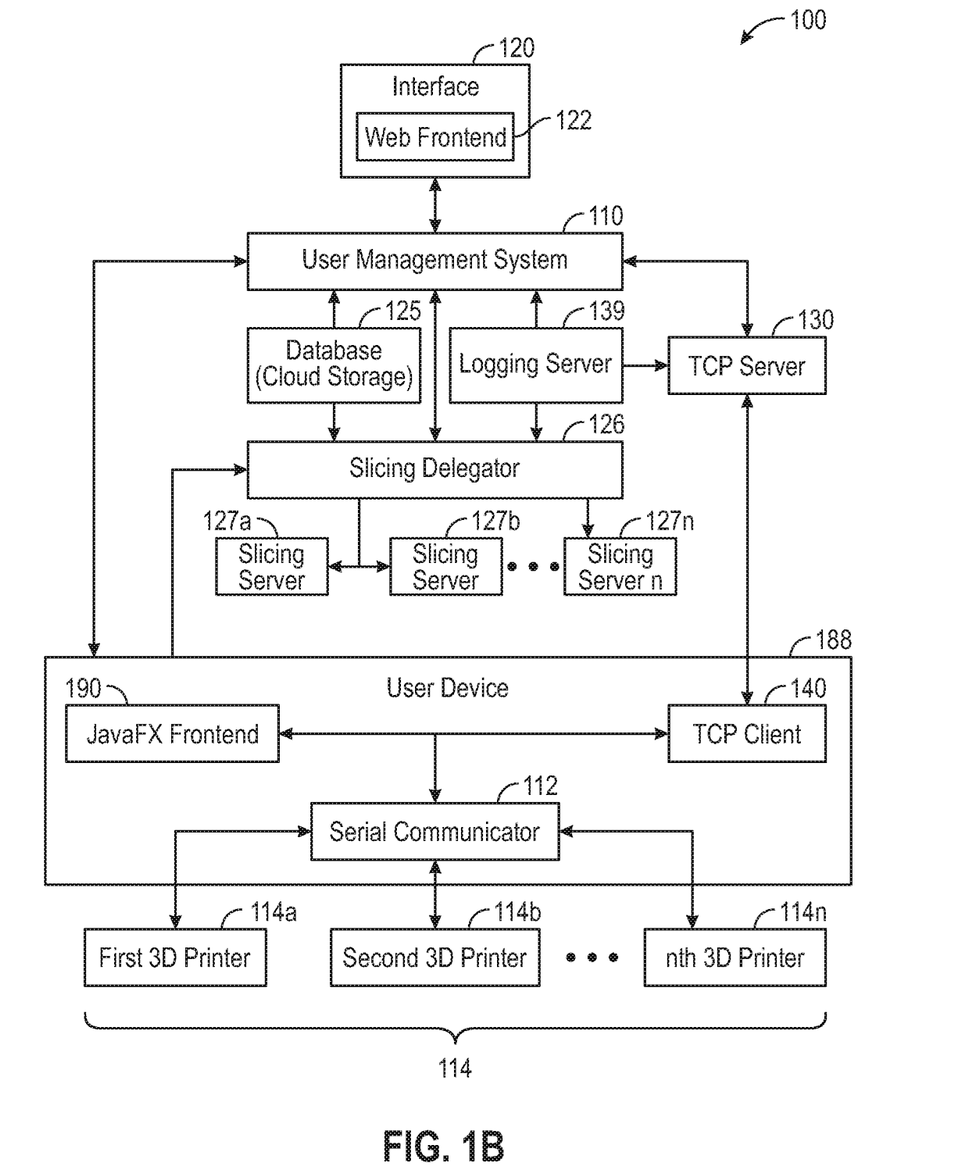
Figure 2:
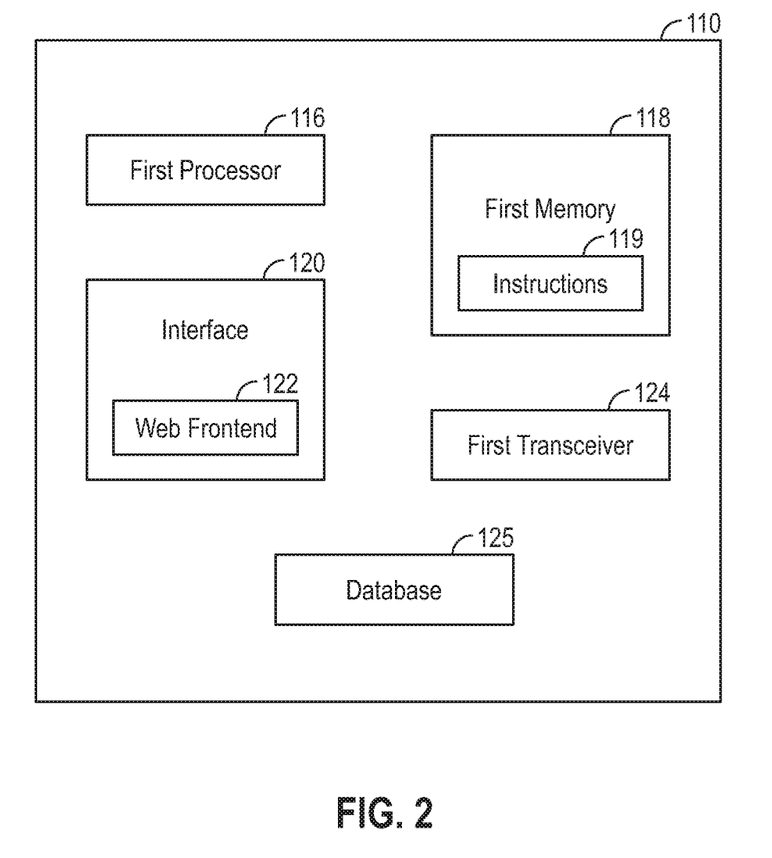
FIG. 2 illustrates a block diagram of User Management System (UMS), in accordance with one embodiment of present invention.

FIG. 1B shows the environment 100 of FIG. 1A depicted in a block diagram fashion. FIG. 1B shows UMS 110 communicating with serial communicator 112 for executing 3D print jobs and managing 3D printers 114. FIG. 2 shows a block diagram of UMS 110. UMS 110 may include first processor 116 and first memory 118. First processor 116 may include central processing unit (CPU), graphics processing unit (GPU) or both. First processor 116 may include any suitable processing device, such as a microprocessor, microcontroller, integrated circuit, logic device, or other suitable processing device.

First memory 118 communicates with first processor 116 via bus (not shown). First memory 118 may include one or more computer-readable media, including, but not limited to, non-transitory computer-readable media, RAM, ROM, hard drives, flash drives, or other memory devices. First memory 118 may store information accessible by first processor 116, including computer-readable instructions 119 that can be executed by first processor 116. In one example, first memory 118 may store data that can be retrieved, manipulated, created, or stored by first processor 116.

Instructions 119 may include any set of instructions that when executed by first processor 116, cause first processor 116 to perform operations. Instructions 119 may also reside, completely or at least partially, within first memory 116 and/or within first processor 116 during execution thereof by UMS 110, first memory 118 and first processor 116 also constituting machine-readable medium. Instructions 119 may further be transmitted or received over a network (not shown) via first transceiver 124 utilizing any one of a number of well-known transfer protocols or a custom protocol.

UMS 110 may include user interface (UI) 120 i.e., software or Application interface allowing user of user device 188 to interact with UMS 110. In one exemplary implementation, user interface 120 may include web front end 122 configured to allow a user of user device 188 to interact with UMS 110 to manage 3D printers 114 via serial communicator 112. Web front end 122 indicates a software application facilitating the user to send or receive information through the UMS 110.

UMS 110 may include first transceiver 124 configured to send and receive data from UMS 110 to other devices such as serial communicator 112 and user device 188.

UMS 110 may include database (cloud storage) 125. Database 125 indicates a data structure configured for storing information. In the current embodiment, database 125 includes 3D printers data, 3D printing data, user data, 3D modelling data, and other data.

In one embodiment, UMS 110 communicates with slicing delegator 126. Slicing delegator 126 may be part of the UMS 110 or operate as a separate entity or server different from the UMS 110. Slicing delegator 126 may further communicate with one more slicing servers e.g., first slicing server 127*a*, second slicing server 127*b* . . . $n_{th}$ slicing server 127*n*. In the current embodiment, UMS 110 receives request for slicing jobs from the user. The request may include a print job comprising 3D modelling data. The request passes from UMS 110 to slicing delegator 126. Slicing delegator 126 analyses the amount of resources such as memory each of the slicing servers 127 (i.e., first slicing server 127*a*, second slicing server 127*b* . . . $n_{th}$ slicing server 127*n*). Based on the analysis, slicing delegator 126 determines which slicing server 127 (first slicing server 127*a*, second slicing server 127*b* . . . $n_{th}$ slicing server 127*n*) need to process the slicing request. The slicing server 127 may process the slicing request based on the 3D modelling data sent by the user. The slicing server 127 slices the 3D modelling data (e.g., 3D model in .stl format) and slices it into individual layers. Subsequently, the slicing server 127 generates a tool path i.e., Gcode that the 3D printer 114 may use for 3D printing a physical object using the 3D modelling data. Gcode indicates a numerical language, utilized by an application or code to slice 3D modelling data to provide instructions to 3D printer 114. The printing instructions may include height, width, and thickness parameters for each of the individual layers. For example, Gcode may include 3-dimensional coordinate values to guide a nozzle of a 3D printer 114 for executing a print job. A person skilled in the art may appreciate that the slicing delegator 126 takes the slicing request and determines which slicing server 127 to send it to depending on the amount of resources the slicing server 127 has and distributes the tasks (slicing jobs).

Figure 3:
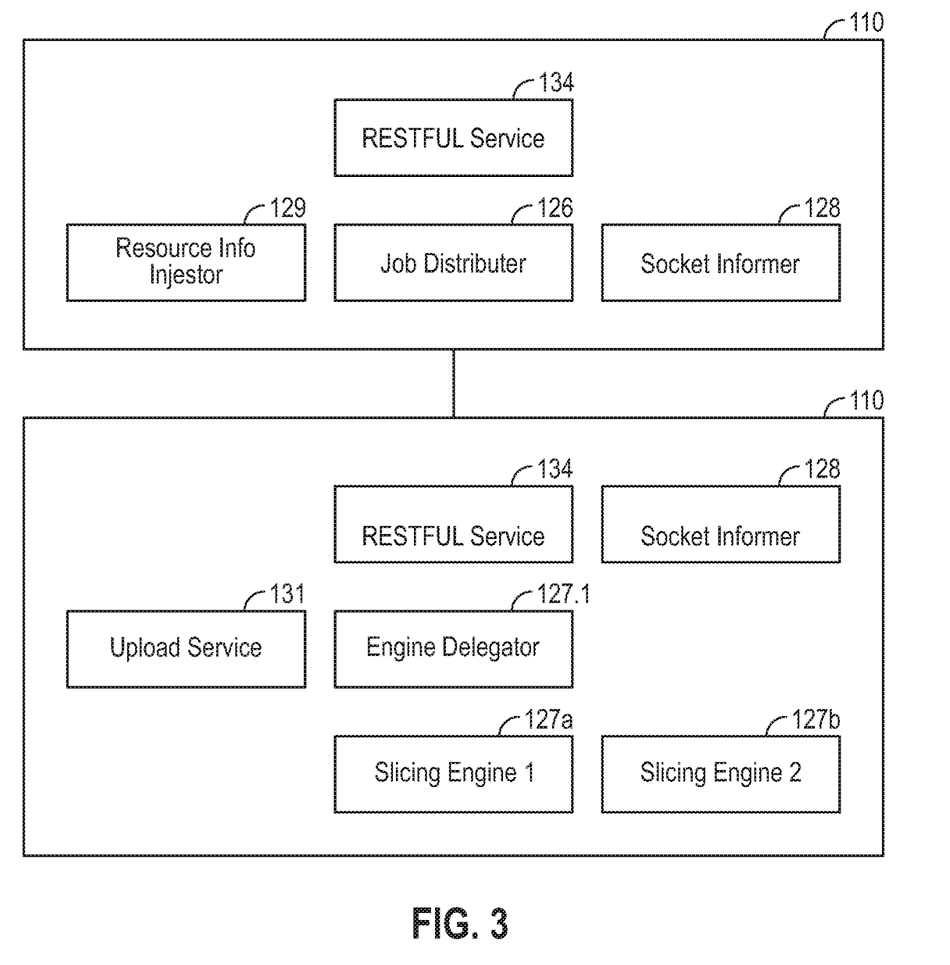
FIG. 3 shows a block diagram of slicing delegator.

FIG. 3 shows a block diagram of slicing delegator 126 delegating the 3D print jobs to one of slicing servers/engines 127. Restful services 134 allow to send and receive the messages between UMS 110 and the control panel. Restful services 134 receive updates corresponding to slicing engines 127 via upload service 131. Slicing delegator 126 receives the 3D print job request and obtains information corresponding to resources of slicing engines 127. Further, slicing delegator 126 communicates with engine delegator 127.1 for allocating 3D slicing tasks to one of slicing server/engines 127 via socket informer 128. Further, slicing delegator 126 obtains resources information of slicing server/engine 127 via resource info ingestor 129.

FIG. 1B shows that the UMS 110 communicates with serial communicator 112 and 3D printers 114 via Transmission Control Protocol (TCP) server 130 and TCP client 140. TCP server-client communicate via a network (not shown). Network may include wireless network, wired network or combination thereof. Network may be implemented as one of the different types of networks, such as intranet, local area network (LAN), wide area network (WAN), the internet, and the like. Network may either be a dedicated network or shared network. Shared network represents an association of the different types of networks that use variety of protocols, for example, Hypertext Transfer Protocol (HTTP), Transmission Control Protocol/Internet Protocol (TCP/IP), Wireless Application Protocol (WAP), and the like, to communicate with one another.

TCP client 140 may include a device or application that connects serial communicator 112 and TCP server 130. In one example, serial communicator 112 or user device 188 may include TCP client 140. TCP client 140 continuously pings TCP server 130 to connect and identify the port number it wants to send and receive data after establishing a connection with TCP server 130. TCP server 130 listens to a connection request initiated by TCP client 140 and accepts or rejects the connection request. Person skilled in the art will appreciate that TCP client 140 provides a unified communication method with UMS 110 using TCP server 130 such that user of the user device 188 may control, view and monitor 3D printers 114 via the web front end 122. Here, when a new 3D printer 114 is added to the plurality of 3D printers 114, then serial communicator 112 provides an update the TCP server. Subsequently, the TCP server 130 posts a message to UMS 110. If the UMS 110 responds, then the TCP server 130 registers the new 3D printer 114 with the UMS 110. UMS 110 updates the information corresponding to the new 3D printer 114 in its first memory 118 and database 125. TCP client 140 allows to deliver data from the web frontend 122 to store in database 125, slicing delegator 126 and TCP server 130. Further, TCP client 140 ensures that the data is delivered to the web frontend 122 such that the user of user device 188 may manage the data through UMS 110.

Figure 4:
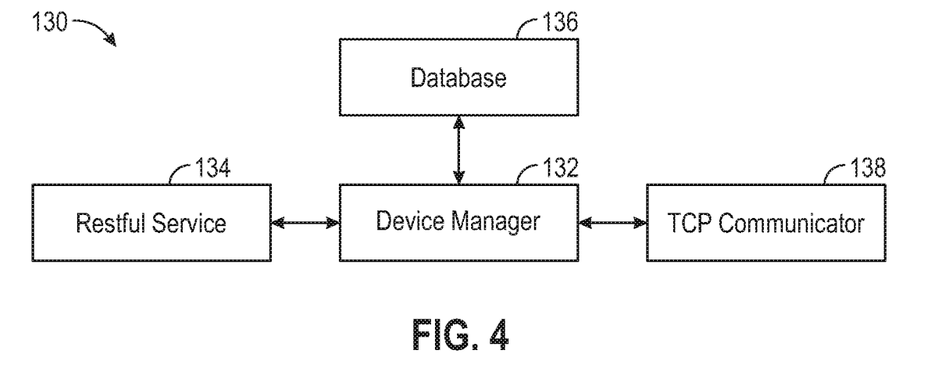
FIGS. 4 and 5 illustrate block diagrams of Transmission Control Protocol (TCP) server and TCP client, respectively, in accordance with one embodiment of present invention.

FIG. 4 shows a block diagram of TCP server 130. In the current embodiment, TCP server 130 comprises a device manager 132. The device manager 132 connects to restful service 134. Further, TCP server 130 may include a separate database 136, and TCP communicator 138. TCP communicator 138 may allow TCP server 130 to communicate with other devices such as UMS 110, database 125, slicing delegator 126, TCP client 140, serial communicator 112 and 3D printers 114. Further, TCP communicator 138 may manage all aspects of protocol ingest and dispatch photo buff files. In one example, UMS 110 may include logging server 139 configured for managing authentication credentials to access each of UMS 110, database 125, slicing delegator 126, TCP client 140, serial communicator 112 and 3D printers 114.

As specified above, TCP server 130 posts the message to UMS 110 to add new 3D printer 114 to the existing 3D printers 114. In order to add new 3D printer 114, TCP server 130 employs device manager 132, restful service 134 and TCP communicator 138. In order to add new 3D printer 114, restful services 134 uses a spark java library to provide a control panel with REST endpoints that UMS 110 on the control panel may use to communicate with the TCP server 130. Here, the restful services 134 allow to send and receive the messages between UMS 110 and the control panel. UMS 110 requests for information about the new 3D printer 114 when it receives the request for adding new 3D printer 114. The restful services 134 respond to the request from the UMS 110 and provide required response messages. Here, protocol communicator 138 ingests the messages and calls for the update of the database 125; 136. The protocol communicator 138 helps to authenticate the message such that the UMS 110 may add the 3D printer 114 to the list of active 3D printers. Protocol communicator 138 encodes and decodes proto messages from base 64 string to java objects. Further, protocol communicator 138 finds a link between the protocols and their respective subroutine that invokes on the message action. Here, the protocol communicator 138 dispatches the message to get all 3D printers 114 from TCP client 140 and gets all comports for a new 3D printer 114.

Device manager 132 manages the 3D printer's connection and adds them to the active stack and verifies the authentication of the 3D printer 114. As soon as the new 3D printer 114 connects to the TCP server 130, device manager 132 sends an authentication (auth) message. Subsequently, the TCP server 130 posts the authentication message to UMS 130. If UMS 110 responds with a good request or positively, then the TCP server 130 adds the 3D printer 114 to the current stack of available 3D printers 114.

Figure 5:
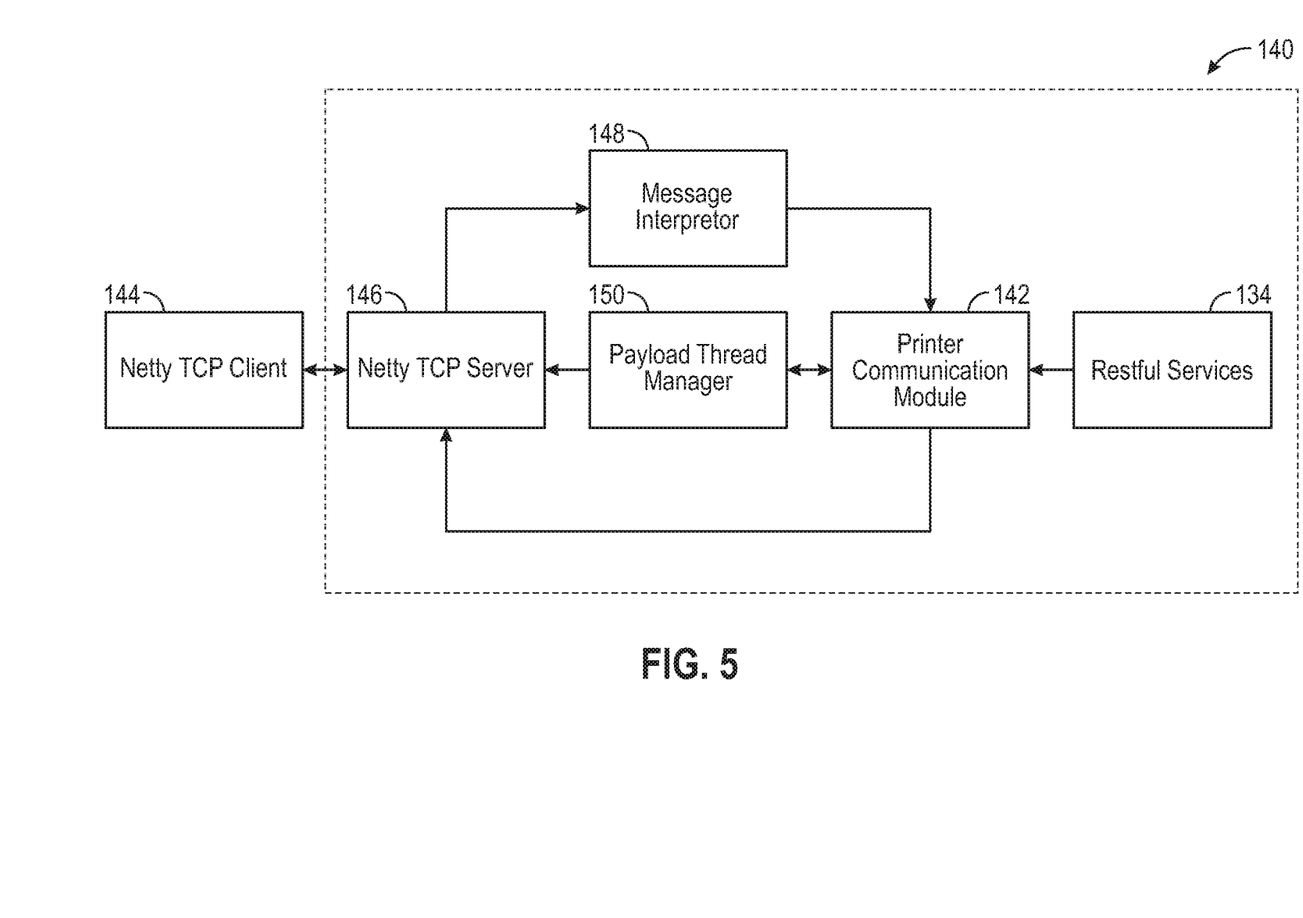

In the current implementation, TCP client 140 provides a unified communication method with UMS 110 using TCP server 130, so that the user of web frontend 122 is able to control, view and monitor the 3D printers 114. FIG. 5 shows a block diagram of TCP client 140. TCP client 140 may include printer communication module 142, Netty TCP server 144, Netty TCP client 146, message interpreter 148, and payload thread manager 150. Here, restful services 134 uses a spark java library to provide the control panel with REST endpoints that UMS 110 on the control panel may use to communicate with the TCP server. The restful services 134 allow to send and receive the messages between UMS 110 and the control panel. UMS 110 requests for information about the new 3D printer 114 when it receives the request for adding new 3D printer 114. The restful services 134 respond to the request from the UMS 110 and provides required response messages.

Printer communication module 142 includes printer commands models (ProtoBuf). Protobuf class may indicate a schema of all printer commands. Here, the printer commands may work in two ways, one for UMS 110 and other for the TCP client 140. Restful services 134 may use printer commands to communicate with the control panel or business modules. The protobuf class gets parameters of 3D printer 114 and generates the printer commands. The message interpreter 148 encodes and decodes the message for UMS 110. The TCPMessage protobuf class contains information of TCPMessage and device (Control Panel). Message interpreter 148 includes a message interpreter class that decodes the incoming messages to the TCP client 140 from UMS 110. The message interpreter class also uses the serial communication restful service to communicate with each other. Here, the TCP server 130 encodes and sends a message to TCP client. The message interpreter class decodes the message using commands protobuf.

Netty TCP client 146 uses netty TCP server 144 to initiate a TCP connection with the TCP server 140. After establishing connection, netty TCP client 146 sends and receives messages using the TCP connection. Here, netty TCP client 146 sends Auth message upon connection initiation. Subsequently, netty TCP client 146 sends message to a uplink server. The message interpreter 148 interprets the message for execution, as explained above.

Payload thread manager 150 manages times payload gathering and messaging to the uplink server. Specifically, payload thread manager 150 manages payload delivery to the TCP server 130. In addition, payload thread manager 150 gathers temperature data and printing progress data in a timely manner and updates UMS 110 via the TCP server 130.

Figure 6:
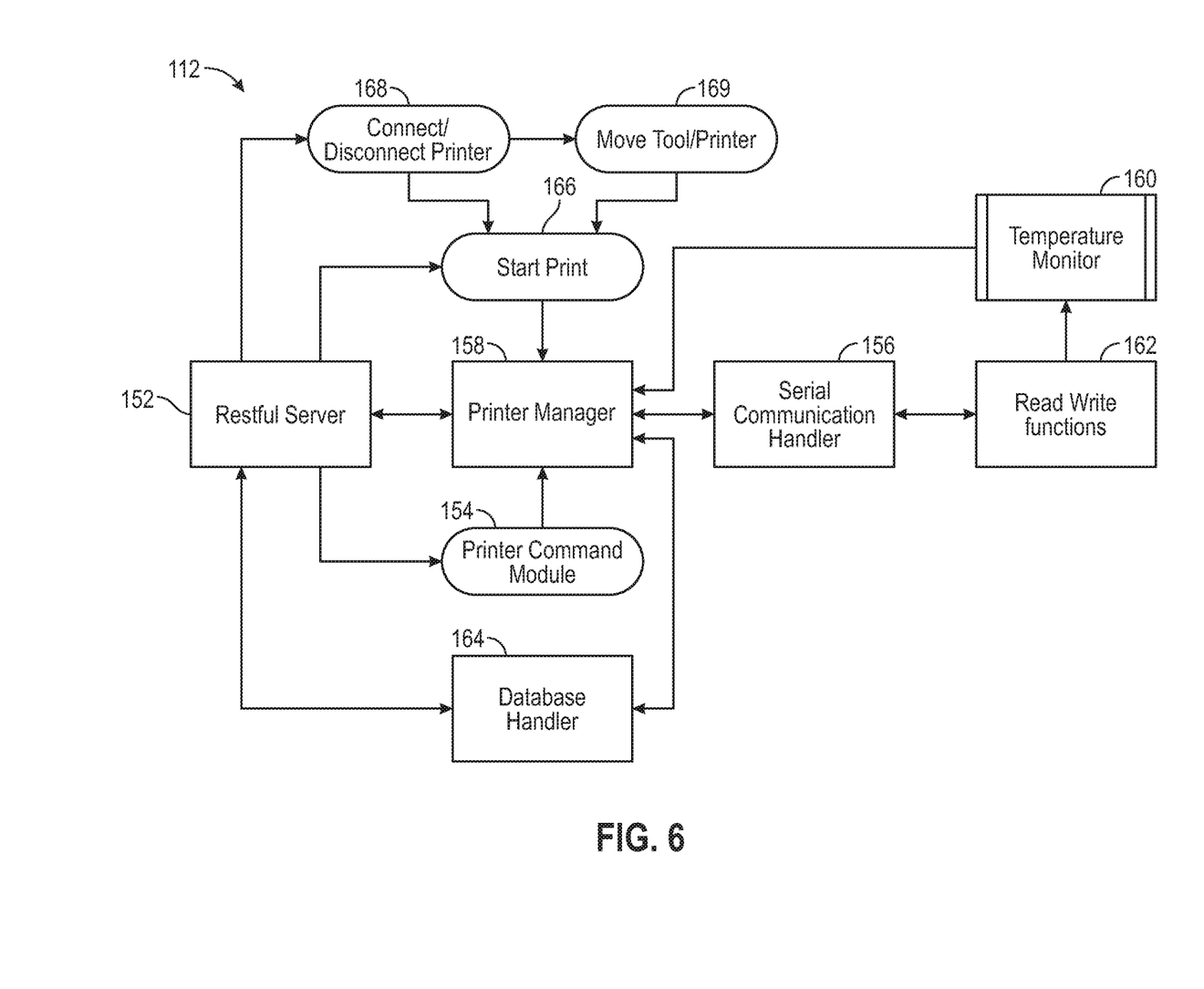
FIG. 6 illustrates a block diagram of serial communicator, in accordance with one embodiment of present invention.

As specified above, TCP client 140 provides a unified communication method between 3D printers 114 and UMS 110. In the current, the unified communication is implemented with the help of serial communicator 112. FIG. 6 shows serial communicator 112, in accordance with one embodiment of the present invention. Serial communicator 112 provides a unified serial communication method with second processor or microcontroller 172 present in each of 3D printers 114. Serial communicator 112 may include restful server 152, printer command module 154, serial communication handler 156, printer manager 158, temperature monitor 160, read and write functions 162, and database handler 164.

Figure 7:
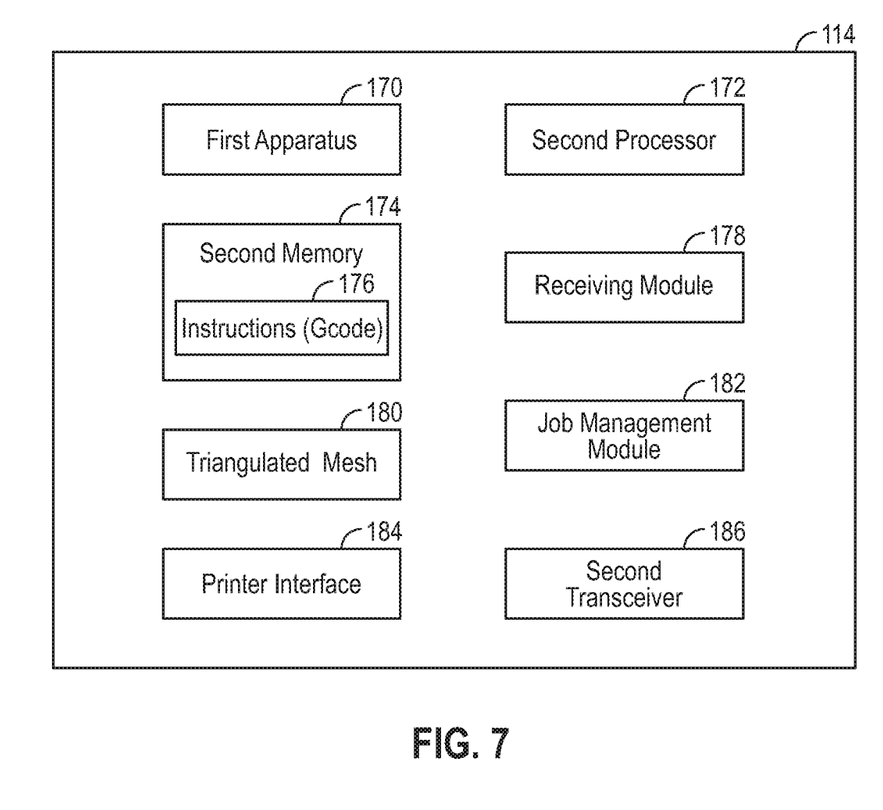
FIG. 7 illustrates a block diagram of 3D printer, in accordance with one embodiment of present invention.

FIG. 7 shows a block diagram of 3D printer 114. 3D printer 114 may include print apparatus 170. Print apparatus 170 may indicate a platform or structure of 3D printer having ability to print 3D objects. 3D printer 114 further includes second processor 172, second memory 174 storing instructions 176. Here, instructions 176 may include Gcode received from slicing server/engine 127. 3D printer 114 may include receiving module 178 configured to receive Gcode from serial communicator 112. 3D printer 114 may include CAD objects or triangulated mesh 180 and job management module 182 configured to manage the queue of print jobs. 3D printer 114 may include printer interface 184 allowing an operator to operate the 3D printer 114. 3D printer 114 may include second transceiver 186 allowing the 3D printer 114 to connect wirelessly to serial communicator 112, UMS 110 and/or user device 188.

User device 188 may include, but not limited to, a mobile phone, desktop, laptop, smart watch, or any other electronic device. In accordance with one implementation, user may execute 3D print jobs on 3D printers 114 through JavaFX frontend 190 of serial communicator 112. In other words, the user of user device 188 accesses the serial communicator 112 using JavaFX frontend 190. In one example, user device 188 encompasses serial communicator 112 and JavaFX frontend 190. JavaFX frontend 190 allows users to interact with the interface of serial communicator 112 to start, control, slice, and monitor their print jobs.

Alternatively, user of user device 188 may access UMS 110 using web frontend 122 and instruct serial communicator 112 using TCP server 130 and TCP client 140 to execute 3D print jobs on 3D printers 114.

Serial communicator 112 may connect to 3D printers 114 via a wired or wireless network. For example, serial communicator 112 may include ports such as Universal Serial Bus (USB) ports to connect to each of the 3D printers 114. In another example, serial communicator 112 may connect to each of the 3D printers 114 via second transceiver 186. It should be understood that serial communicator 112 establishes connection with each of the 3D printers 114 using serial communication. This allows the serial communicator 112 to concurrently connect to multiple 3D printers 114 and manage multiple connections to multiple 3D printers 114. The number of 3D printers 114 connecting serial communicator 112 may depend on resources (amount of serial busses such as USB ports) of serial communicator 112 and/or 3D printers 114. Using serial communication, serial communicator 112 establishes connection with supported 3D printers 114. This allows serial communicator 112 to concurrently send and receive commands, instructions and status message from each of 3D printers 114 to user device 188 and/or UMS 110 via JavaFX frontend 190. Serial communicator 112 uses serial communication provides multiple and synchronous dimensionality to UMS 110 with a single application. In other words, serial communicator 112 facilitates in managing multiple series connections to multiple 3D printers 114.

Referring to FIGS. 1B and 6, operation of serial communicator 112 for executing print jobs by concurrently sending and receiving commands, instructions and status message from each of 3D printers 114 is explained. Database handler 164 connects to database 125 for storing and retrieving information corresponding to each of the 3D printers 114. For instance, database handler 164 includes printer information and print job class. Printerinfo class provides printer information and saves the data in the database 125. Further, Printerinfo class performs getprinterinfo function by passing printer name to the database 125. Printjob class stores information corresponding to the printing process.

Serial communication handler 156 handles all the incoming and outgoing serial messages from each of the 3D printers 114 to serial communicator 112. A person skilled in the art may appreciate that serial communication handler 156 handles multiple serial connections. For example, serial communication handler 156 handles start connection, stop connection, serial write, serial read listener, among other serial messages.

Printer manager 158 handles all aspects of context of each 3D printer 114. Printer manager 158 handles the creation of 3D printer 114, facilitates the connection to 3D printer 114 and facilitates the printing on that 3D printer 114. This allows serial communication handler 156 to establish serial communication with 3D printer 114 to facilitate the controlling of 3D printer 114. In addition, printer manager 158 provides an identity to 3D printer 114 for adding printer, deleting printer, connecting printer, providing Gcode functions and movement functions. Printer manager 158 provides a unique listener for each added 3D printer 114 for viewing the communication the 3D printer sending to UMS 110 and/or user device 188. In addition, printer manager 158 executes or performs a variety of functions. For example, printer manager 158 performs read and write functions 162. In another example, printer manager 158 provides start/stop print commands to 3D printer 114. In another example, printer manager 158 performs operation to connect or disconnect 3D printers. In yet another example, printer manager 158 performs operations to move a tool to execute the 3D jobs or move the 3D printer 114 itself.

Temperature monitor 160 in serial communicator 112 monitors the temperatures of heating elements in each of the 3D printers 114. For example, temperature monitor 160 monitors temperature of 3D printer 114 at predefined time intervals e.g., every 3 second time intervals. As such, temperature monitor 160 queries each connected 3D printer 114 with an update temp request to monitor temperature of 3D printer 114. Further, temperature monitor 160 records at least ten (10) temp updates and delivers the temperatures in json format. Alternatively, temperature monitor 160 sets up auto pooling to record the temperature.

Restful server 152 of serial communicator 112 utilizes the restful services 134 to communicate with the serial communicator 112. Here, the restful services get required parameters for each service from the control panel or business module. The restful services perform actions as per the required parameters and provide necessary responses in response to the requesting module.

Printer command module 154 comprises printer command models that provide a structure and define the needs for each command that is sent to each 3D printer 114. For example, the printer movement command object may contain a class that organizes commands and generates Gcode to move the 3D printer 114. Here, the printer command module 154 obtains required X, Y, Z, or E and the feed rate from the user and creates Gcode commands to execute that movement.

Further, printer command module 154 obtains required printer and position from the user, creates the Gcode command and executes that movement. In addition, printer command module 154 obtains required heating element and temperature from the user, creates Gcode command and then executes set temperature. In one implementation, printer command module 154 utilizes a Gcode sender containing a set of subroutines the serial communicator 112 uses to send lines of Gcode to the connected 3D printer 114. As specified above, the slicing server 127 may generate the Gcode including 3-dimensional coordinate values to guide a nozzle of a 3D printer 114 for executing the print job. Here, the subroutine may be of high priority as it may include one of the basic functions of the print apparatus 170 to print on the 3D printer 114. For example, consider that the user loads 3D object file (Gcode) into the Gcode sender. The Gcode sender prompts the changing of the printer status from idle to printing if the printer is idle in the database. The Gcode sender streams the each line of Gcode to the 3D printer 114 one after another. Gcode sender continues to stream Gcode upon receiving response from 3D printer 114 indicating that there is more space in 3D printer's buffer to accept a new Gcode command. After receiving the response, Gcode sender streams a new line of Gcode to 3D printer 114. When paused, the Gcode sender stops sending lines of Gcode to the 3D printer 114 and writes the last sent line number to the database 125. This allows the Gcode sender to stream Gcode to resume from that line in the Gcode file. When unpaused or resumed, the 3D printer 114 obtains the last streamed line number from the paused Gcode file and streams from that last streamed line. When stopped, the Gcode sender skips the lines to go to the end Gcode section of the Gcode file and executes the Gcode. Subsequently, Gcode sender changes the status of the print in database 125 as "stopped". Further, when Gcode file streams completely, the Gcode sender changes status of the print job in database 125 as "finished". As such, Gcode sender extracts printing progress (status) information during the print and updates the status in the database 125 via database handler 164.

Serial communicator 112 further includes a Gcode Analyser. The Gcode analyser parses the Gcode to extract the information to display an overview of the Gcode file or to check for compatibility with 3D printer 114. For example, Gcode analyser may analyse maximum Z axis, maxZ value, to check how high the file will move the print head. Gcode analyser may analyse maximum Y axis, maxY values, to check if the max Y value the file will make the 3D printer move too. Gcode analyser may analyse maximum X axis, max X, to check if the max X value in the Gcode file will make the printer move too. In addition, Gcode analyser may analyse filament used, time estimate, layer height of the print, bed temperature, nozzle temperature, fan speed and/or auto level sensor.

When user sends the Gcode file corresponding to 3D modelling data (print job), serial communicator 112 assigns the print job to available 3D printers based on status and print job queue at the 3D printer. Serial communicator 112 establishes serial communication with each 3D printer 114 and manages a fleet of 3D printers 114 for a distributed manufacturing system's ecosystem. Serial communicator 112 sends Gcode file to selected 3D printer 114. 3D printer 114 receives the Gcode file and outputs a 3D solid figure corresponding to the 3D modelling data. In one implementation, serial communicator 112 allows user to select one of the available 3D printers 114 to execute 3D print job.

Figure 8:
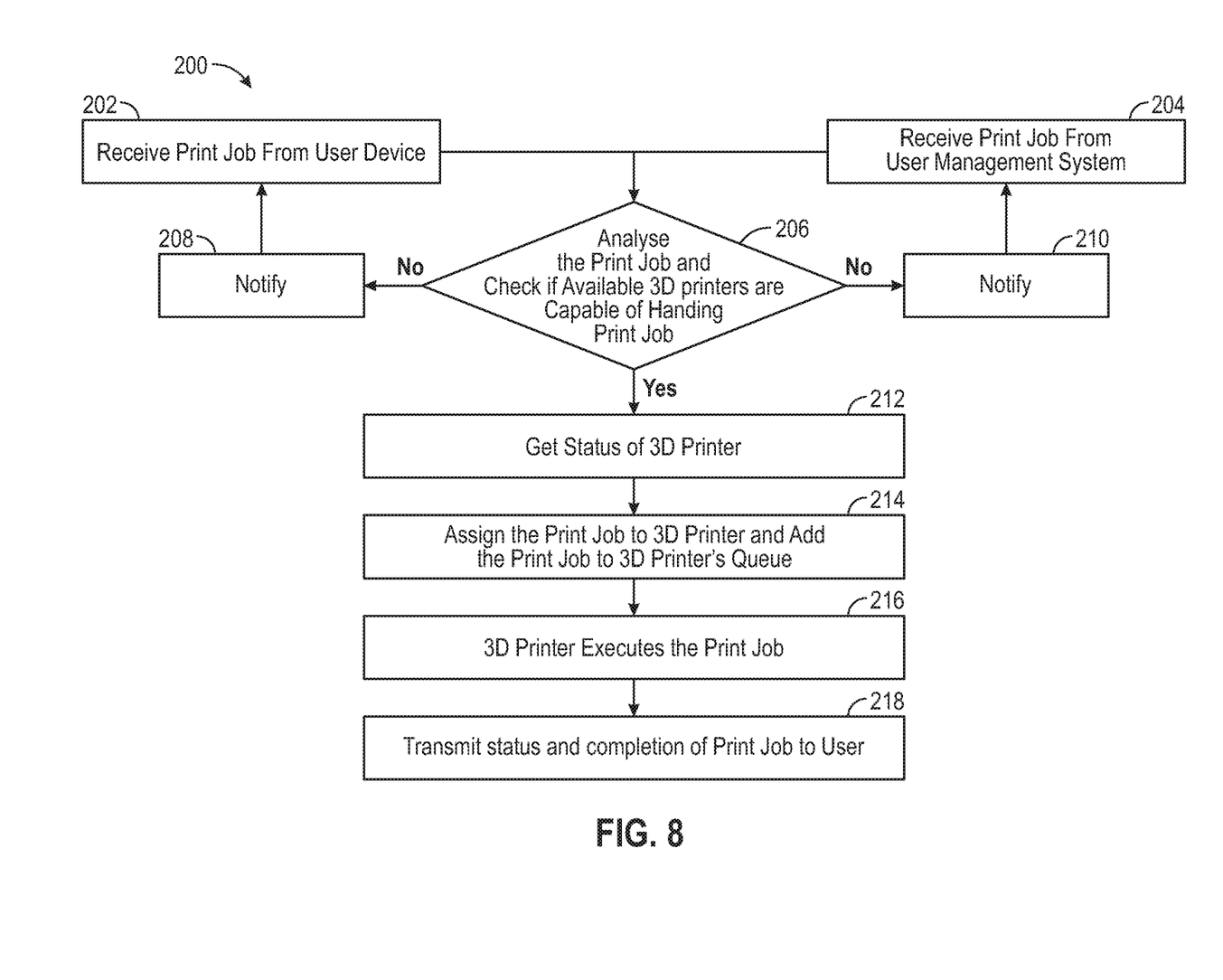
FIG. 8 illustrates a method implemented by the serial communicator, in accordance with one embodiment of present invention.

FIG. 8 shows a method 200 of managing multiple serial connections to multiple 3D printers is explained with illustrations, in accordance with one exemplary embodiment of the present invention. The order in which method 200 is described should not be construed as a limitation, and any number of the described method blocks can be combined in any order to implement method 200 or alternate methods. Additionally, individual blocks may be deleted from method 200 without departing from the spirit and scope of the subject matter described herein. Furthermore, method 200 can be implemented in any suitable hardware, software, firmware, or combination thereof. However, for ease of explanation, in the embodiments described below, method 200 may be implemented using the above-described serial communicator 112.

Method 200 starts at step 202 or step 204. At step 202, serial communicator 112 receives a request for 3D print job (3D modelling data) from user device 188 JavaFX frontend 190. Alternatively, serial communicator 112 receives a request for 3D print job from UMS 110 via web frontend 122. At step 206, serial communicator 112 analyses the print job and checks if any of the available 3D printers 114 is capable of handling the print job. If the available 3D printers 114 cannot handle, then serial communicator 112 notifies user device 188 (step 208) or UMS 110 (step 210).

If the available 3D printers 114 can handle the print job, then serial communicator 112 obtains status of the 3D printer 114 (step 212). As specified above, serial communicator 112 establishes connection with 3D printers 114 using serial communication. As such, the serial communicator 112 assigns the print job serially and adds the print jobs to 3D printer's queue (step 214). Concurrently, serial communicator 112 updates status to user device 188 or UMS 110.

At step 216, 3D printer executes the print job based on the 3D modelling data provided by the user. At step 218, serial communicator 112 transmits status and completion of the print job to user.

Figure 9:
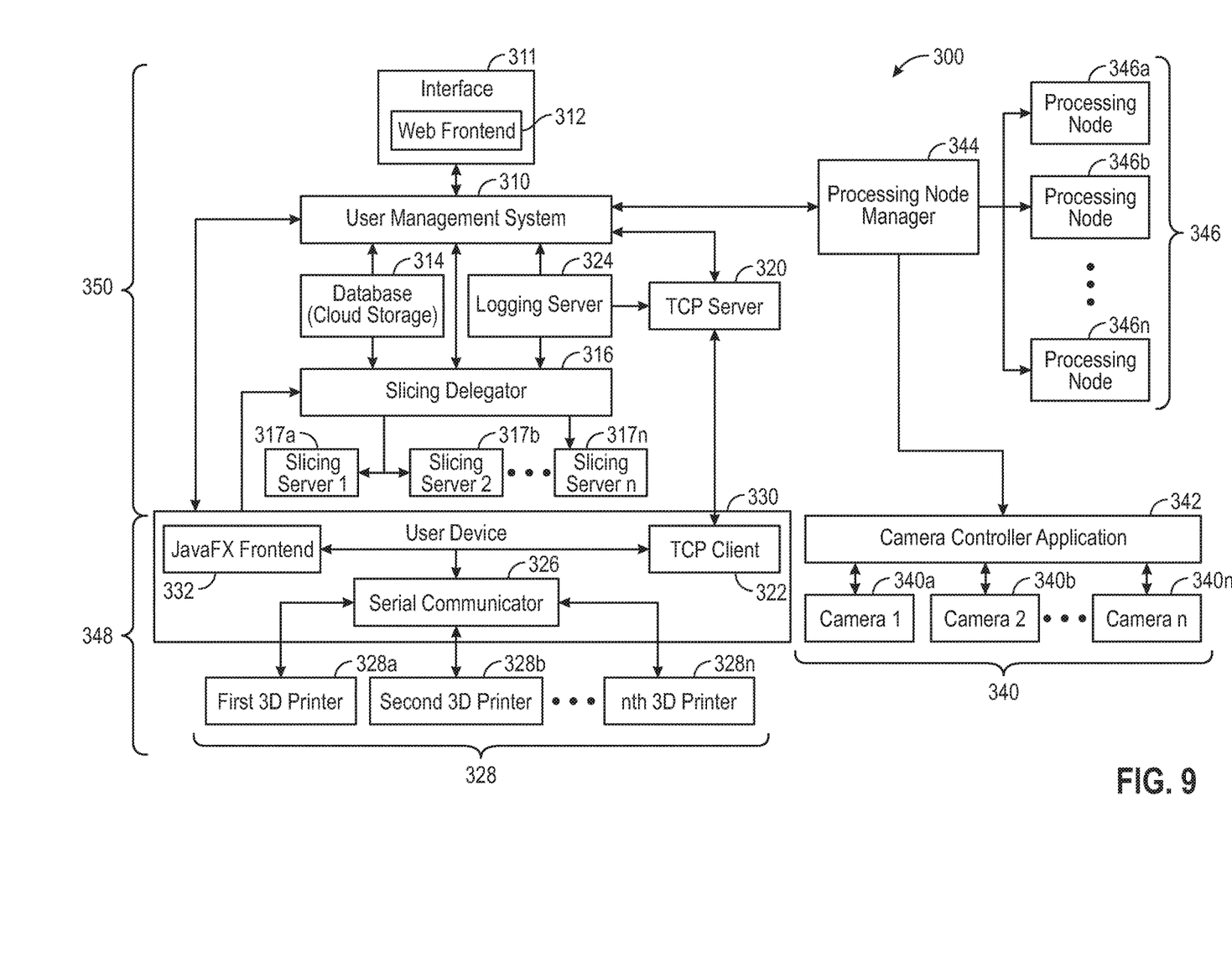
FIG. 9 illustrates an environment and a block diagram of a serial communicator facilitating multiple and synchronous communication with three-dimensional (3D) printers, in accordance with another embodiment of present invention.

FIG. 9 shows a block diagram 300 in which User Management System (UMS) 310 communicates with serial communication module 326 for managing plurality of three-dimensional (3D) printers 328, in accordance with another embodiment of the present invention. UMS 310 includes interface 211 having web front end 312. User accesses UMS 310 via web front end 312 as explained above. UMS 310 includes database 314. UMS 310 slicing delegator 316. Slicing delegator 316 communicates with one more slicing servers 317 e.g., first slicing server 317a, second slicing server 317b . . . $n_{th}$ slicing server 317n.

UMS 310 communicates with serial communicator 326 and 3D printers 328 via Transmission Control Protocol (TCP) server 320 and TCP client 322. UMS 310 may include logging server 324 managing authentication credentials to access each of UMS 310, database 314, slicing delegator 316, TCP client 320, serial communicator 326 and 3D printers 328.

3D printers 328 may include a plurality of 3D printers such as first 3D printer 328a, second 3D printer 328b, . . . $n_{th}$ 3D printer 328n.

User device 330 accesses the serial communicator 326 via JavaFX frontend 332. As specified above, JavaFX frontend 332 allows users to interact with the interface of serial communicator 326 to start, control, slice, and monitor their print jobs.

In the current embodiment, UMS 310 may include plurality of image sensors or cameras such as first camera 340a, second camera 340b, . . . $n_{th}$ third camera 340c, collectively referred as camera(s) 340. Camera controller application 342 allows the cameras 340 to connect to serial communicator 326 via UMS 310 and processing node manager 344. Processing node manager 344 connects to camera controller application 342 and processing nodes 346. Processing nodes 346 include first processing node 346a, second processing node 346b, . . . $n_{th}$ processing node 346n.

Here, each camera 340 may direct toward 3D printer 328. Camera 340 captures audio or images or video associated with each printer 328. For example, camera 340 may capture working volume, 3D object, or any other hardware associated with 3D printer 328. Camera 340 may transmit the images either periodically or in real time to processing node manager 344 via camera controller application 342. Camera controller application 342 may incorporate artificial intelligence (AI) features and allow to monitor each 3D printer 328 from anywhere over the internet. Thus, camera controller application 342 allows users complete control over their job's progress and assists them in the process through regular notifications. In addition, camera controller application 342 allows users to visually monitor status of the print job. In one example, web front end 312 may include a status area configured to show status information such as percentage of completion, time until start, time until completion and so on.

In one implementation, processing node manager 344 may employ processing node 346 to process the images and/or video captured by the camera 340. Processing node manager 344 may detect defects or anomaly in the 3D printer process or the 3D printer 328 itself leading to failure of 3D printing. Processing node manager 344 may notify the user via UMS 310 to take necessary steps to correct the 3D printing or to stop/terminate the 3D printing.

In one exemplary implementation, user device 330, serial communicator 326, 3D printers 328, cameras 340 and camera control application 342 may locate on Internet of Things (IoT) device 348 and remaining components on may locate in the cloud 350, as shown in FIG. 8.

Based on the above, it is evident that serial communicator establishes connection with 3D printers using serial communication with each of the 3D printers. This allows the serial communicator to concurrently connect to multiple 3D printers and manage multiple connections to multiple 3D printers. The number of 3D printers connecting serial communicator may depend on resources (amount of serial busses such as USB ports) of serial communicator and/or 3D printers. Using serial communication, serial communicator establishes connection with supported 3D printers allowing it to concurrently send and receive commands, instructions and status message from each of 3D printers to user device and/or UMS. Serial communicator uses serial communication provides multiple and synchronous dimensionality to UMS with a single application.

In addition, the presently disclosed serial communicator provides a comprehensive 3D printing management platform for the users in a variety of application. For example, the present invention incorporates the slicing feature in management platform having an easy to use 3D viewer and toolbar. Further, the present invention provides a 3D printing project management feature. 3D printing project management feature allows users to optimize task management for each individual project. Users may prioritize projects based on profitability and deadlines, generate documents like invoices and quotations and communicate with teammates and clients, all in one place.

The present invention provides a 3D printer online storage feature. This allows the users to store 3D models, G-codes, documentation, statistics, and any other data required to run their projects. In addition, present invention provides a 3D printer report generation feature. This feature enables users to generate reports that are vital for improving the overall 3D printing process. Users may analyse their 3D printer's performance, identify trends in filament consumption and spending, and plan ahead using this information.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. In addition, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, should be understood as being implemented by computer programs.

Further, certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

It should be understood that components shown in FIGUREs are provided for illustrative purpose only and should not be construed in limited sense. A person skilled in the art will appreciate alternate components that may be used to implement the embodiments of the present invention and such implementations will be within the scope of the present invention.

While preferred embodiments have been described above and illustrated in the accompanying drawings, it will be evident to those skilled in the art that modifications may be made without departing from this invention. Such modifications are considered as possible variants included in the scope of the invention.

What is claimed is:

1. A method of providing serial communication for operating three-dimensional (3D) printers, the method comprising:
    establishing, by a serial communicator, connection with a plurality of three-dimensional (3D) printers using a serial communication, the serial communicator concurrently connects and manages each of the plurality of 3D printers;
    receiving, by the serial communicator, a request for a print job from a user, the print job comprising a 3D modelling data;
    analysing, by the serial communicator, the print job with respect to capability of the plurality 3D printers connected to the serial communicator to execute the print job;
    assigning, by the serial communicator, the print job to a 3D printer of the plurality of 3D printers based on the analysis;
    executing, by the serial communicator, the print job at the 3D printer; and
    transmitting, by the serial communicator, status of the print job execution to the user.

2. The method of claim 1, further comprising connecting a user management system (UMS) to the serial communicator via a Transmission Control Protocol (TCP) server and a TCP client.

3. The method of claim 2, further comprising connecting, by the UMS, the serial communicator to a slicing delegator, the slicing delegator determining a slicing server for slicing the 3D modelling data.

4. The method of claim 3, further comprising analysing, by the slicing delegator, amount of resources of the slicing server for processing the 3D modelling data.

5. The method of claim 4, further comprising slicing, by the slicing server, the 3D modelling data into individual layers.

6. The method of claim 5, further comprising generating, by the slicing server, a tool path to be sent to the 3D printer for 3D printing via the serial communicator.

7. A serial communicator providing serial communication for operating three-dimensional (3D) printers, the serial communicator comprising:
    a serial communication handler configured for establishing connection with a plurality of three-dimensional (3D) printers using a serial communication, the serial communication handler concurrently connects and manages each of the 3D printers;
    a print manager configured for receiving a request for a print job from a user, the print job comprising a 3D modelling data, the print manager further configured for:
        analysing the print job with respect to capability of the plurality 3D printers connected to the serial communicator to execute the print job;
        assigning, by the serial communicator, the print job to a 3D printer of the plurality of 3D printers based on the analysis;
        executing, by the serial communicator, the print job at the 3D printer; and
        transmitting, by the serial communicator, status of the print job execution to the user.

8. The serial communicator of claim 7, further comprises a user management system (UMS) connected to the serial communicator via a Transmission Control Protocol (TCP) server and a TCP client.

9. The serial communicator of claim 8, further comprises a slicing delegator connected to the UMS, the slicing delegator configured for determining a slicing server for slicing the 3D modelling data.

10. The serial communicator of claim 9, wherein the slicing delegator analyses the amount of resources of the slicing server for processing the 3D modelling data.

11. The serial communicator of claim 10, wherein the slicing server slices the 3D modelling data into individual layers and generates a tool path to be sent to the 3D printer for 3D printing via the serial communicator.

12. A method of providing serial communication for operating three-dimensional (3D) printers, the method comprising:
    connecting, by a user management system (UMS), a serial communicator via a Transmission Control Protocol (TCP) server and a TCP client;

establishing, by the serial communicator, connection with a plurality of three-dimensional (3D) printers using a serial communication, the serial communicator concurrently connecting and managing each of the 3D printers;

receiving, by the serial communicator, a request for a print job from the UMS, the print job comprising a 3D modelling data;

analysing, by the serial communicator, the print job with respect to capability of the plurality 3D printers connected to the serial communicator to execute the print job;

assigning, by the serial communicator, the print job to a 3D printer of the plurality of 3D printers based on the analysis;

executing, by the serial communicator, the print job at the 3D; and transmitting, by the serial communicator, status of the print job execution to the UMS.

13. The method of claim 12, further comprising connecting, by the UMS, a slicing delegator, the slicing delegator determining a slicing sever for slicing the 3D modelling data.

14. The method of claim 13, further comprising analysing, by the slicing delegator, amount of resources of the slicing server for processing the 3D modelling data.

15. The method of claim 14, further comprising slicing, by the slicing server, the 3D modelling data into individual layers.

16. The method of claim 15, further comprising generating, by the slicing server, a tool path to be sent to the 3D printer for 3D printing via the serial communicator.

17. The method of claim 12, further comprising capturing, by an image sensor, images corresponding to working volume, 3D object and hardware of the 3D printer executing the 3D printing.

18. The method of claim 17, further comprising processing, by a processing node manager, the images captured for detecting defect or anomaly in the 3D printing.

19. The method of claim 18, further comprising terminating, by the UMS, the 3D printing upon detecting defects.

20. The method of claim 17, further comprising processing, by a processing node manager, the images captured for notifying the user of 3D printing process.

* * * * *